(12) United States Patent
Files et al.

(10) Patent No.: US 9,211,673 B2
(45) Date of Patent: Dec. 15, 2015

(54) HEAT SEALABLE PACKAGING MATERIAL WITH IMPROVED HOT TACK

(71) Applicant: Graphic Packaging International, Inc., Atlanta, GA (US)

(72) Inventors: John C. Files, Vancouver, WA (US); Anthony Keith Webb, Vancouver, WA (US)

(73) Assignee: Graphic Packaging International, Inc., Atlanta, GA (US)

(*) Notice: Subject to any disclaimer, the term of this patent is extended or adjusted under 35 U.S.C. 154(b) by 69 days.

(21) Appl. No.: 14/143,171

(22) Filed: Dec. 30, 2013

(65) Prior Publication Data

US 2014/0113790 A1  Apr. 24, 2014

Related U.S. Application Data

(62) Division of application No. 13/014,745, filed on Jan. 27, 2011.

(60) Provisional application No. 61/300,134, filed on Feb. 1, 2010.

(51) Int. Cl.
  *D21H 27/30* (2006.01)
  *B29C 65/00* (2006.01)
  *D21H 19/22* (2006.01)

(52) U.S. Cl.
  CPC ............... *B29C 66/01* (2013.01); *D21H 19/22* (2013.01); *D21H 27/30* (2013.01); *Y10T 156/1038* (2015.01); *Y10T 428/2826* (2015.01)

(58) Field of Classification Search
  None
  See application file for complete search history.

(56) References Cited

U.S. PATENT DOCUMENTS

| | | |
|---|---|---|
| 3,083,184 A | 3/1963 | Loeb |
| 4,640,865 A | 2/1987 | Lancaster et al. |
| 4,766,035 A | 8/1988 | Lancaster et al. |
| 4,795,665 A | 1/1989 | Lancaster et al. |
| 4,847,155 A | 7/1989 | Lancaster et al. |
| 4,965,130 A | 10/1990 | Min et al. |
| 5,763,100 A | 6/1998 | Quick et al. |
| 5,837,383 A | 11/1998 | Wenzel et al. |

(Continued)

FOREIGN PATENT DOCUMENTS

| | | |
|---|---|---|
| EP | 0 804 505 B1 | 6/1999 |
| WO | WO 96/22329 | 7/1996 |

OTHER PUBLICATIONS

International Search Report and Written Opinion dated Oct. 6, 2011 for PCT/US2011/022658.

(Continued)

*Primary Examiner* — Barbara J Musser
(74) *Attorney, Agent, or Firm* — Womble Carlyle Sandridge & Rice, LLP

(57) ABSTRACT

A method of forming a package includes depositing polyvinylidene chloride on a substrate, wherein the substrate comprises paper, drying the polyvinylidene chloride on the substrate to form a packaging material including less than 5 wt % water, applying water to the packaging material so that the packaging material includes at least about 8 wt % water, and bringing a first portion of the polyvinylidene chloride of the packaging material into contact with a second portion of the polyvinylidene chloride of the packaging material in the presence of heat to form a seal. The at least about 8 wt % water is operative for increasing a hot tack of the seal relative to the packaging material including less than 5 wt % water.

18 Claims, 6 Drawing Sheets

(56) References Cited

U.S. PATENT DOCUMENTS

| | | |
|---|---|---|
| 5,989,724 A | 11/1999 | Wittosch et al. |
| 6,150,451 A | 11/2000 | Berube |
| 7,235,308 B2 | 6/2007 | Druckrey et al. |
| 7,404,999 B2 | 7/2008 | Wilhoit et al. |
| 7,416,767 B2 | 8/2008 | Wilhoit et al. |
| 8,398,802 B2 * | 3/2013 | Kohler .................. B31F 1/285 156/205 |
| 2002/0090508 A1 | 7/2002 | Nowak et al. |
| 2004/0091585 A1 | 5/2004 | Theisen et al. |
| 2004/0182049 A1 | 9/2004 | Duffield |
| 2006/0286325 A1 | 12/2006 | Swoboda et al. |
| 2007/0160789 A1 | 7/2007 | Merical et al. |
| 2007/0292569 A1 | 12/2007 | Bohme et al. |
| 2007/0292705 A1 | 12/2007 | Moncla et al. |
| 2009/0152268 A1 | 6/2009 | Whiteman et al. |
| 2010/0120313 A1 | 5/2010 | Bohme et al. |

OTHER PUBLICATIONS

"Vinylidene Chloride Monomers and Polymers", Saran Barrier Systems, Dow Plastics, Dec. 2000 (44 pages), reprinted in part from Kirk-Othmer: Encyclopedia of Chemical Technology, Fourth Edition, vol. 24 (New York: John Wiley & Sons, Inc. 1997, pp. 882-923 (1997)).

* cited by examiner

HEAT SEALABLE PACKAGING MATERIAL WITH IMPROVED HOT TACK

CROSS-REFERENCE TO RELATED APPLICATIONS

This application is a divisional of U.S. patent application Ser. No. 13/014,745, filed Jan. 27, 2011, which claims the benefit of U.S. Provisional Application No. 61/300,134, filed Feb. 1, 2010, both of which are incorporated by reference in their entirety.

BACKGROUND

Form and fill type packaging machines are commonly used for a variety of packaging applications. In such machines, a packaging material is typically unwound from a roll, formed into a tube around a mandrel, and the free edges are sealed together (e.g., to form a fin seal). The bottom end of the tube is then sealed together to form an end seal, often using a pair of heated jaws or clamps. As the seal is being formed, the items to be packaged are inserted (often dropped) into the package. As a result, the newly formed heat seal needs to have sufficient "hot tack" or "hot tack strength" to support the weight of the package contents. Thus, there remains a need for packaging materials that provide sufficient hot tack strength, even under rigorous manufacturing conditions. For some applications, there is also a need for such materials to be repulpable.

SUMMARY

This disclosure is directed generally to various packaging materials, methods of making such packaging materials, and methods of using such packaging materials.

The packaging material may generally include a substrate, for example, paper, and a heat seal layer disposed on the substrate. The heat seal layer may comprise one or more polymers or polymeric materials that are capable of forming a heat seal. In one example, the heat seal layer may comprise polyvinylidene chloride (PVdC).

The packaging material may include (e.g., be provided with) at least about 8 wt % moisture (e.g., water), for example, from about 10 wt % to about 18 wt % moisture. The moisture may be contained substantially within the substrate, although it is contemplated that some moisture may be disposed on or in the heat seal layer. The presence of at least about 8 wt % moisture increases the hot tack of the seal (i.e., the tackiness or strength of a seal immediately after formation but before solidification of the sealing material), as compared with the hot tack of a seal formed from a similar packaging material with less than about 8 wt % moisture. This increase in hot tack may be advantageous for numerous packaging applications, and may be particularly advantageous where low temperature heat sealing is needed, for example, to increase production rates. Additionally, the increase in hot tack may allow a heavier "charge" (i.e., product content) to be dropped into the bag without causing the seal to fail. Further, the presence of at least about 8 wt % moisture has been found to increase the hot tack window of the packaging material, thereby increasing the range of operating conditions that may be used to successfully form a heat seal.

If desired, the packaging material containing the at least about 8 wt % moisture may be wound into a roll. The packaging material may be used in the formation of various packages, wraps, pouches, or other constructs for containing food items, seeds, or any other item prone to spoilage or leakage. The packaging material may also be repulpable.

Other features, aspects, and embodiments will be apparent from the following description and the accompanying figures and examples.

BRIEF DESCRIPTION OF THE DRAWINGS

The description refers to the accompanying schematic drawings, in which like reference characters refer to like parts throughout the several views, and in which.

DESCRIPTION

Various aspects of the invention may be illustrated by referring to the figures, which depict examples of packaging materials. For purposes of simplicity, like numerals may be used to describe like features. It will be understood that the relative thicknesses of the various layers may be altered or exaggerated for purposes of illustration, and that such thicknesses are not indicative of actual or relative thicknesses of actual structures.

Figure 1:
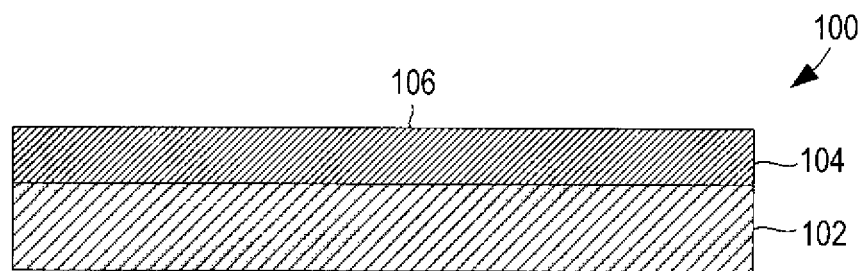
FIGS. 1-4 are schematic cross-sectional views of exemplary packaging materials.

FIG. 1 depicts a schematic cross-sectional view of an exemplary packaging material 100. The packaging material 100 generally includes a plurality of layers in a substantially facing, contacting relationship with one another. The packaging material 100 may be formed into a package using any suitable process, for example, a conventional form and fill type process.

In the exemplary embodiment shown in FIG. 1, the packaging material 100 includes a substrate 102 and a heat seal layer 104 in a facing relationship with one another. The packaging material also includes a pair of outermost surfaces 106, 108 opposite one another, in this example, defined by the outermost surfaces of the heat seal layer 104 and substrate 102, respectively. When the packaging material 100 is formed into a package, outermost surface 108 (in this example, the exposed surface of the substrate 102) generally faces outwardly from and/or defines the exterior side or surface of the package, and outermost surface 106 (in this example, the exposed surface of the heat seal layer 104) generally faces towards and/or defines the interior side or surface of the package. The packaging material may include additional layers, as will be discussed below.

The substrate 102 generally comprises a base material from which the packaging material 100 is formed, for example, paper or paperboard.

The heat seal layer 104 generally comprises a polymer or polymeric material that is capable of being sealed against (i.e., bonded or joined to) itself or another material in the presence of heat. In one exemplary packaging material 100, the heat seal layer 104 may comprise polyvinylidene chloride (PVdC). A PVdC heat seal layer 104 may also serve as a barrier layer for reducing the transmission of air, water vapor, and other gases through the packaging material 100. Examples of PVdC that may be suitable for use with the packaging material 100 include DARAN® SL112, DARAN® SL143, DARAN® SL158, and DARAN® SL159, each of which is available commercially from Owensboro Specialty Polymers (Owensboro, Ky.). The heat seal and barrier properties of such materials as provided by the manufacturer are set forth in Table 1. However, other PVdC polymers and/or other polymers or polymeric materials may be suitable.

TABLE 1

| DARAN® product | Heat seal temp. lower limit (° F.) | OTR* (cc/100 sq. in./24 h) 25° C., 65% RH | | WVTR* (g/100 sq. in./24 h) 100° F., 90% RH | |
|---|---|---|---|---|---|
| | | 2.5 lb/ream | 7.5 lb/ream | 2.5 lb/ream | 7.5 lb/ream |
| SL112 | 270 | 0.34 | 0.13 | 0.49 | 0.15 |
| SL143 | 250 | 1.40 | 0.43 | 1.10 | 0.34 |
| SL158 | 230 | 0.96 | 0.32 | 0.53 | 0.18 |
| SL159 | 230 | 1.00 | 0.32 | 0.55 | 0.18 |

The packaging material 100 may generally include (e.g., be provided with) at least about 8 wt % moisture (e.g., water), which may generally be bound within (or disposed on) the paper substrate. For example, the packaging material 100 may include from about 10 wt % to about 18 wt % moisture, for example, from about 12 wt % to about 16 wt % moisture. In one particular example, the packaging material 100 may include about 14 wt % moisture. However, other moisture levels and ranges thereof may be suitable.

Under typical manufacturing conditions, the moisture content of the packaging material may be less than about 8 wt %, for example, from about 5 to about 7 wt %. However, the present inventors have discovered that a moisture content of at least about 8 wt % may significantly increase the hot tack of the packaging material, as compared with a packaging material containing less than about 8 wt % moisture. For example, in some instances, the hot tack of a packaging material with a moisture level of at least about 8 wt % may be about 25%, about 30%, about 35%, about 40%, about 45%, about 50%, about 55%, about 60%, about 65%, about 70%, about 75%, about 80%, about 85%, about 90%, about 95%, about 100%, about 105%, about 110%, about 115%, about 120%, about 125%, about 130%, about 135%, about 140%, about 145%, about 150%, about 155%, about 160%, about 165%, about 170%, about 175%, about 180%, about 185%, about 190%, about 195%, or about 200% greater than a similar packaging material with less than about 8 wt % moisture.

This result is unexpected and surprising. While not wishing to be bound by theory, it is believed that the additional moisture may make the substrate more pliable, which may then allow the heat seal layer of the packaging material to make better contact with, and adhere to, itself more effectively. Alternatively or additionally, the additional moisture may increase the heat transfer from the sealing device to the heal seal layer. In any case, unlike many presently available materials that creep or flow when the heat seal is stressed (e.g., when the contents are added to the bag on a form and fill packaging machine), a heat seal formed using the present packaging material may remain intact using a heavier product charge (i.e., package contents), and may remain intact over a greater range of temperatures, thereby rendering the packaging material more suitable for a wider range of commercial applications.

Additionally, the present inventors have discovered that the presence of at least about 8 wt % moisture in the packaging material (e.g., within the substrate) has been found to increase the hot tack window of the packaging material. As a result, the packaging material may be formed into a package at a wider range of temperatures and/or other operating conditions.

Further, the present inventors have generally observed that a lower polymer coat weight material with a relatively high moisture content can provide a hot tack that is at least equivalent to the hot tack of a packaging material including a higher polymer coat weight material and a relatively low moisture content. Thus, the desired level of hot tack may be achieved using less polymer. This may provide a significant cost advantage in many packaging applications.

Notably, the packaging material 100 is also repulpable and recyclable because the PVdC of the heat seal layer 104 can be readily dissociated from the cellulose fibers of the paper substrate 102.

FIGS. 2-5 illustrate several exemplary variations of the packaging material 100 of FIG. 1. The various packaging materials 200, 300, 400 include features that are similar to the packaging material 100 shown in FIG. 1, except for variations noted and variations that will be understood by those of skill in the art. For simplicity, the reference numerals of similar features are preceded in the figures with a "2" (FIG. 2), "3" (FIG. 3), or "4" (FIG. 4) instead of a "1".

Figure 2:
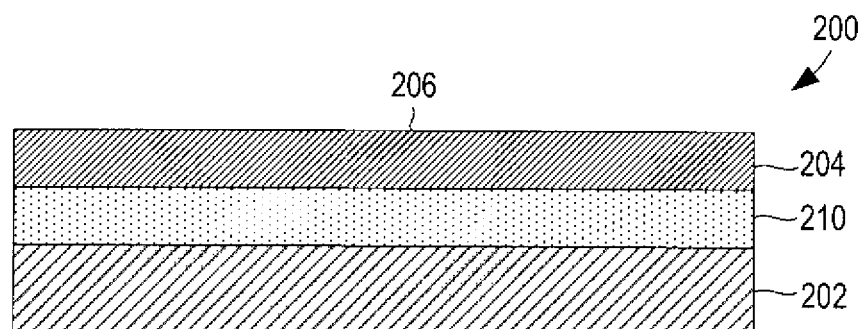

For example, in the exemplary packaging material 200 of FIG. 2, a polymer layer 210 (e.g., first polymer layer) is disposed between the substrate 202 and heat seal layer 204 (e.g., second polymer layer). Polymer layer 210 may comprise any suitable material and may be provided for any purpose, as needed or desired for a particular packaging application.

In one example, both polymer layers 204, 210 may comprise PVdC. In such an example, the layers 204, 210 may be configured to impart various attributes to the resulting packaging material 200. For example, polymer layer 204 may be selected based on its heat seal properties, while polymer layer 210 may be selected based on its hold out properties and/or barrier properties. As another example, both polymers 204, 210 may be selected based on their heat seal properties. For instance, by selecting two PVdC polymers having different softening temperatures, the range of heat seal temperatures of the packaging material 200 may be effectively broadened, which allows for a greater range of operating conditions on the packaging equipment.

Thus, in one particular example, polymer layer 210 may comprise DARAN® SL112 and polymer layer 204 may comprise DARAN® SL158 and/or DARAN® SL159. In another example, polymer layer 210 may comprise DARAN® SL143 and polymer layer 204 may comprise DARAN® SL158 and/or DARAN® SL159. In still another example, polymer layer 210 may comprise DARAN® SL112 and polymer layer 204 may comprise DARAN® SL143.

Other examples of polymers that may be suitable for polymer layer 210 include, but are not limited to, ethylene vinyl alcohol (EVOH), barrier fluoropolymer, other readily repulpable materials, or any combination thereof. Further, one or more primer layers may be used to obtain the desired level of adhesion between the various layers of the packaging material. Numerous other possibilities are contemplated.

In addition to providing the desired heat seal and barrier characteristics, the packaging material 200 may also be repulped and recycled.

Figure 3:
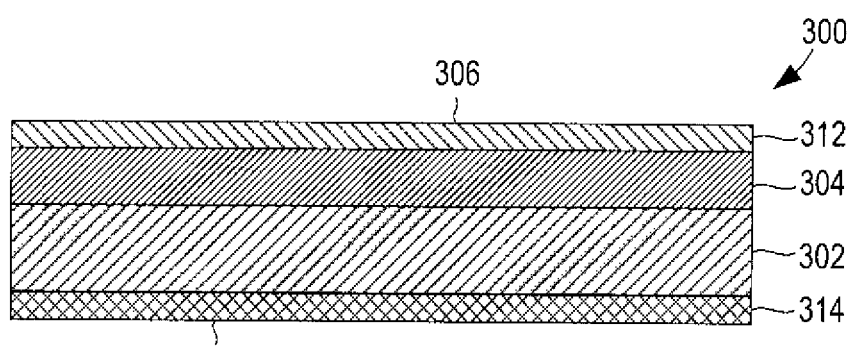

Turning now to FIG. 3, the packaging material 300 may also include one or more coatings or layers that modify the surface characteristics of the packaging material. Such layers may generally comprise outermost layers of the packaging material. For example, an anti-blocking layer or coating 312 may be applied to polymer layer 304, as shown in FIG. 3. In other embodiments, the polymer layer 304 may include an anti-blocking additive or material (e.g., as with DARAN® SL159), so that no additional layer 312 is necessary. Alternatively or additionally, a slip modifier 314 (e.g., a wax) may be applied to the exposed side of the substrate 302 to modify the coefficient of friction of the substrate 302. As with the above materials, packaging material 300 may also be repulped and recycled.

Figure 4:
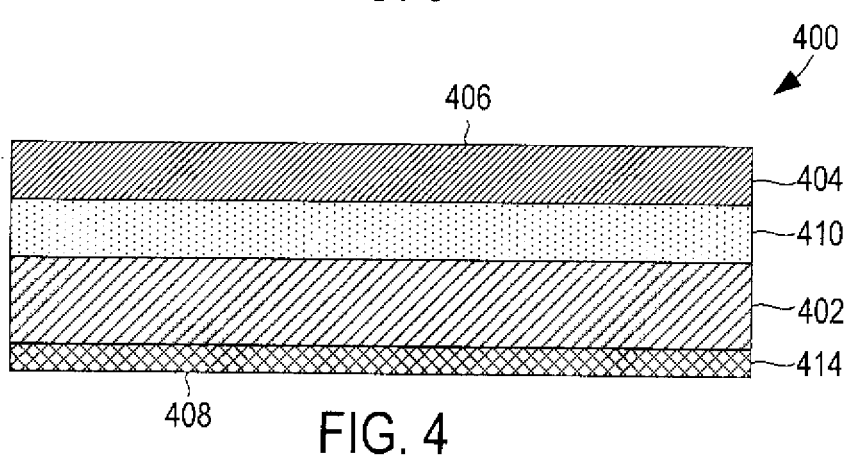

In another example shown in FIG. 4, the packaging material 400 includes a polymer layer 410 (which may be similar to polymer layer 210) disposed between the substrate 402 and heat seal layer 404, and a slip modifier 414 (e.g., a wax) (which may be similar to slip modifier 314) disposed on the substrate 402. In such an example, the slip modifier 414 may define at least a portion of the outermost surface 408 of the packaging material 400. As with the above materials, packaging material 400 may also be repulped and recycled.

While some exemplary packaging materials (e.g., packaging materials 100, 200, 300, 400) are illustrated herein, it will be appreciated that countless other possibilities are contemplated. Each packaging material and the layers thereof may vary for each application. Further, any of the various layers described above may be used in any combination, as needed or desired for a particular packaging application. It also will be appreciated that various materials may be used to form each layer of the packaging material, and that each layer may have various basis weights or coat weights, depending on the particular application. Further, layers may be added or omitted as needed or desired for each packaging application.

For example, the substrate (e.g., substrate 102, 202, 302, 402) may have a basis weight of from about 20 to about 330 lb/ream (lb/3000 sq ft.), for example, from about 40 to about 60 lb/ream, for example, from about 25 to about 45 lb/ream. Other ranges and basis weights are contemplated.

The substrate may be flat or extensible. Further, if desired, the substrate may comprise a grease resistant material, for example, a paper or paperboard that is impregnated (or otherwise treated with) a grease resistant chemical, for example, fluorochemical. Alternatively, the paper or paperboard may be coated with one or more grease resistant materials.

Further, one or more portions or sides of the substrate may be coated with varnish, clay, or other materials, either alone or in combination. For example, at least the side of the substrate that will form an exterior surface of the package may be coated with a clay coating or other base coating. The coating may then be printed over with product advertising, images, price coding, any other information or indicia, or any combination thereof. The base coating then may be overcoated with a varnish to protect any information printed thereon.

Each polymer layer (e.g., polymer layer 104, 204, 210, 304, 404, 410) independently may have a dry basis weight of from about 1 lb/ream to about 10 lb/ream, for example, about 1 lb/ream, about 1.5 lb/ream, about 2 lb/ream, about 2.5 lb/ream, about 3 lb/ream, about 3.5 lb/ream, about 4 lb/ream, about 4.5 lb/ream, about 5 lb/ream, about 5.5 lb/ream, about 6 lb/ream, about 6.5 lb/ream, about 7 lb/ream, about 7.5 lb/ream, about 8 lb/ream, or any other suitable dry basis weight.

The combined dry basis weight of the polymer layers of the particular packaging material may be less than about 20 lb/ream, for example, about 15 lb/ream, about 14 lb/ream, about 13 lb/ream, about 12 lb/ream, about 11 lb/ream, about 10 lb/ream, about 9 lb/ream, about 8 lb/ream, about 7 lb/ream, about 6 lb/ream, about 5 lb/ream, about 4 lb/ream, or any other suitable weight. In one specific example, the heat seal layer (e.g., polymer layer 104, 204, 304, 404) may have a basis weight of from about 4 to about 10 lb/ream, for example, about 7 lb/ream, and the intermediate polymer layer (e.g., polymer layer 210, 410) may have a basis weight of from about 2 to about 8 lb/ream, for example, about 5 lb/ream. However, other basis weights and ranges are contemplated hereby.

Where barrier properties are sought, any or all of the polymer layers (e.g., polymer layers 104, 204, 210, 304, 404, 410) may have an oxygen transmission rate (OTR) as measured using ASTM D3985 of less than about 75 $cc/m^2/day$, less than about 60 $cc/m^2/day$, less than about 50 $cc/m^2/day$, less than about 45 $cc/m^2/day$, less than about 30 $cc/m^2/day$, less than about 20 $cc/m^2/day$, less than about 10 $cc/m^2/day$, less than about 1 $cc/m^2/day$, or any other suitable OTR or range of OTRs. Likewise, in each of various independent examples, any or all of the polymer layers e.g., polymer layers 104, 204, 210, 304, 404, 410) of the particular packaging material may have a water vapor transmission rate (WVTR) as measured using ASTM F1249 of less than about 100 $g/m^2/day$, less than about 50 $g/m^2/day$, less than about 15 $g/m^2/day$, less than about 1 $g/m^2/day$, less than about 0.1 $g/m^2/day$, less than about 0.05 $g/m^2/day$, or any other WVTR or range of WVTRs.

It will be noted that, in some applications, for example, French fry bags, the package may include slits or other features to permit the air to escape after filling the package. This allows a plurality of packages to be packed more efficiently into boxes or other cartons for shipping. In such applications, any measure of barrier properties would pertain only to the areas of the material without such slits.

Where used, a slip modifying coating or layer (e.g., slip modifier 314, 414) may have a coat weight (dry) of less than about 1 lb/ream, for example, from about 0.05 to about 0.8 lb ream, for example, from about 0.1 to about 0.6 lb/ream, for example, from about 0.25 to about 0.5 lb/ream. Other ranges and amounts are contemplated.

The various layers of the packaging material (e.g., packaging material 100, 200, 300, 400) may be formed, assembled, and/or joined in suitable manner. In one exemplary process, the various layers (e.g., polymer layers 104, 204, 210, 304, 404, 410) may be coated onto the substrate (e.g., substrate 102, 202, 302, 402) as aqueous dispersions and then dried. The moisture content of the packaging material may then be increased to the desired level using any suitable process. For example, in one exemplary process, the packaging material may pass through a plurality of coaters or sprayers (or other treater) that apply water to the substrate. The precise number of such coaters or sprayers may depend on the desired level of moisture in the packaging material. In some embodiments, one coater or sprayer may be sufficient, while in other embodiments, two or more coaters or sprayers may be needed to attain the desired moisture content. If desired, one or more of such coaters or sprayers also may be used to apply a slip modifier (e.g., slip modifier 314, 414) to the substrate, either separately from or concurrently with (e.g., blended with) the water used to moisturize the packaging material. Numerous other processes may be used.

After the water is applied to the substrate, the packaging material may be supplied substantially directly to a conventional form and fill packaging machine or any other suitable manufacturing machine to form a package, or the packaging material (including the at least about 8 wt % moisture) may be formed into a roll that extends around a core, such as a tubular core, either for substantially immediate use or for later use. The packaging material (including the at least about 8 wt % moisture) may then be unwound from the roll and then be supplied to the conventional form and fill packaging machine or any other suitable manufacturing machine. For example, the packaging material may be formed into a tube (or tubular structure) with the heat seal layer facing inwardly, the edges may be joined to one another (e.g., to form a fin seal), and the inwardly facing heat seal layer may be joined to itself (e.g., as opposed panels or faces of the tube, such that a first portion of the heat seal layer is sealed to a second portion of the heat seal layer) to form end seals. As stated above, the use of at least about 8 wt % moisture in the present packaging material provides increased hot tack and an increased hot tack window relative to similar packaging materials having a lower moisture content.

In accordance with one aspect of this disclosure, irrespective of whether the packaging material is supplied directly or indirectly (e.g., by way of a roll) to the conventional form and fill packaging machine or any other suitable manufacturing machine, the seals (e.g., for forming a package such as a bag) may be formed in the packaging material prior to any substantial drying of the packaging material. Accordingly, each of the above-discussed moisture contents may be applicable to the packaging material immediately after the application of the water thereto, while the packaging material in roll form and/or the packaging material while the seals (e.g., for forming a package such as a bag) are formed therein. Accordingly, provisions may be made that seek to inhibit any undesirable drying of the packaging material. For example, if a roll of packaging material may not be used for an extended period of time and/or may be exposed to an environment that may dry the packaging material to an undesired level, the roll of the packaging material may be wrapped in a protective material (e.g., polymer film), or the like. It is also contemplated that where undesirable moisture loss has occurred, the packaging machine may be provided with a source of water (e.g., sprayer, roll coater, or other suitable apparatus) for increasing the moisture content of the packaging material prior to forming the packaging material into a package.

The present invention may be understood further by way of the following examples, which are not to be construed as limiting in any manner. All values are approximate unless otherwise noted.

Example 1

Various packaging materials were formed on production machinery and evaluated for hot tack at various moisture levels. First, 43 lb/ream natural Kraft paper was coated with about 7 lb/ream of DARAN® SL112 PVdC and dried at a speed of 800 fpm at a temperature of about 300° F. The coated sheet was then coated with about 5 lb/ream of DARAN® SL159 PVdC and dried at a temperature of about 360° F. After drying, the packaging materials were moistened at 750 fpm using a Dahlgren moisturizer using a mixture of 98.7 parts water and 1.3 parts Michemlube 156 (Michelman, Cincinnati, Ohio) applied to the underside of the sheet. The applicator roll speed was varied to produce a range of moisture contents. Moisture was measured on a Moistrex moisture analyzer.

The hot tack of the packaging materials was evaluated using ASTM 1921-98 with a Lako Tools SL-10 Hot Tack and Seal Strength Tester (jaw pressure of 60 psi, seal time of 0.25 sec, and seal area of 0.75 square inches) over a temperature range of 210° F. to 310° F. at 20° F. intervals. The results are presented in Table 2 and FIG. 5.

TABLE 2

| Seal Temp | Hot tack at various moisture levels (g/in) | | | |
|---|---|---|---|---|
| (° F.) | 6.8 wt % | 10.6 wt % | 12.2 wt % | 14.3 wt % |
| 210 | 89 | 94 | 130 | 293 |
| 230 | 245 | 225 | 301 | 547 |
| 250 | 300 | 413 | 489 | 741 |
| 270 | 298 | 542 | 673 | 773 |
| 290 | 409 | 658 | 725 | 784 |
| 310 | 468 | 663 | 747 | 814 |

Figure 5:
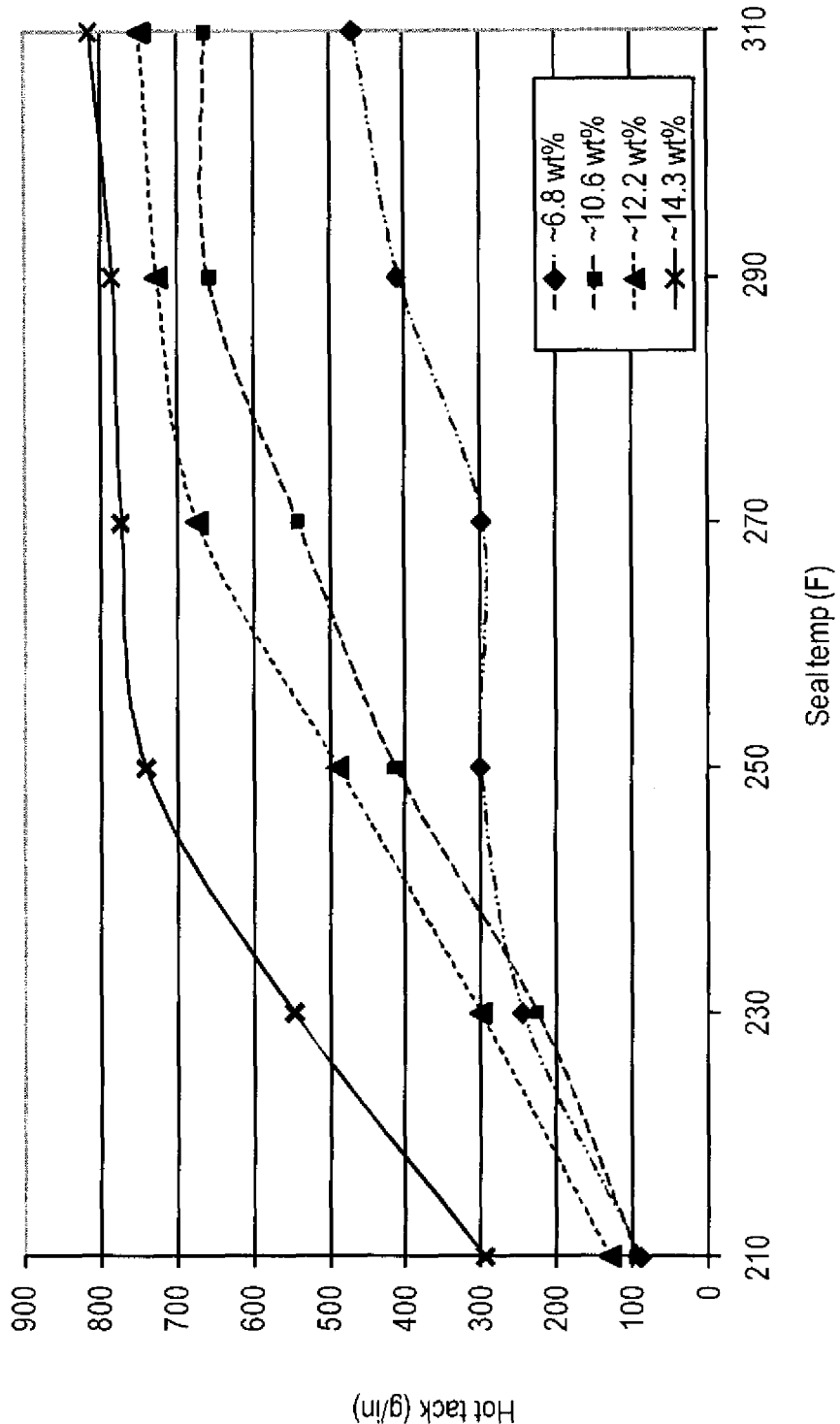
FIGS. 5-9 present the hot tack or heat seal strength data for exemplary packaging materials at various moisture levels.

As is evident from FIG. 5 and Table 2, the hot tack of the packaging materials generally increased with moisture content and seal temperature. It will be noted that while this effect has been described herein with PVdC, it will be appreciated that increasing the moisture level of packaging materials including other heat seal layers also may result in an enhanced hot tack.

Example 2

Samples of the packaging material formed in Example 1 were evaluated to determine whether the packaging material was repulpable. Despite the presence of the PVdC layers, the polymers separated from the fiber in water and were retained on a 0.010" flat screen so that the fibers could be successfully be reformed into paper. This may provide a significant advantage over other packaging materials that are not repulpable.

Example 3

The hot tack temperature window (i.e., the range between the lower and upper self-tack limits) was determined for the material of Example 1 at various moisture levels using a Sencorp Heat Sealer, Model 12ASL/1, fitted with a Hot Tack Attachment with a 200 g weight. A 2 by 4 inch sample was placed into the apparatus and pushed into sealing jaws with the weight supported by hand. The seal conditions were 80 psi and 0.25 sec. As the jaws closed, the weight was released and the sample was removed from the jaws. The width of the seal that was pulled apart by the falling action of the weight was recorded. The material passed the test if less than 0.25 inch of the sealed area separated. The highest and lowest temperature at which the material passed the test defines the hot tack window. The results are presented in Table 3. As indicated in Table 3, the samples including 14.2 wt % moisture had a wider hot tack window than the samples including 9.5 wt %.

TABLE 3

| Moisture level (wt %) | Low hot tack (° F.) | High hot tack (° F.) | Hot tack window (° F.) |
|---|---|---|---|
| 9.5 | 270 | 385 | 115 |
| 14.2 | 240 | 400 | 160 |

Example 4

Various packaging materials were evaluated for hot tack and heat seal strength. To form the base packaging material, a 43 lb/ream TEA-Kraft paper (Spec 2400 from Longview Fibre Paper and Packaging, Inc., Longview Wash.) was coated with about 6-7 lb/ream DARAN® SL112 PVdC and dried. The material was then coated with about 5-6 lb/ream DARAN® SL159 PVdC and dried. The total polymer weight was about 12 lb/ream.

To form the experimental packaging materials (i.e., the packaging materials with a moisture level above about 8 wt %), the coated paper was then moisturized with water using a Dahlgren moisturizer. The moisturized packaging material was then perforated and again moisturized (on the paper side) with a mixture of 98.7 parts water and 1.3 parts Michemlube 156.

Figure 6:
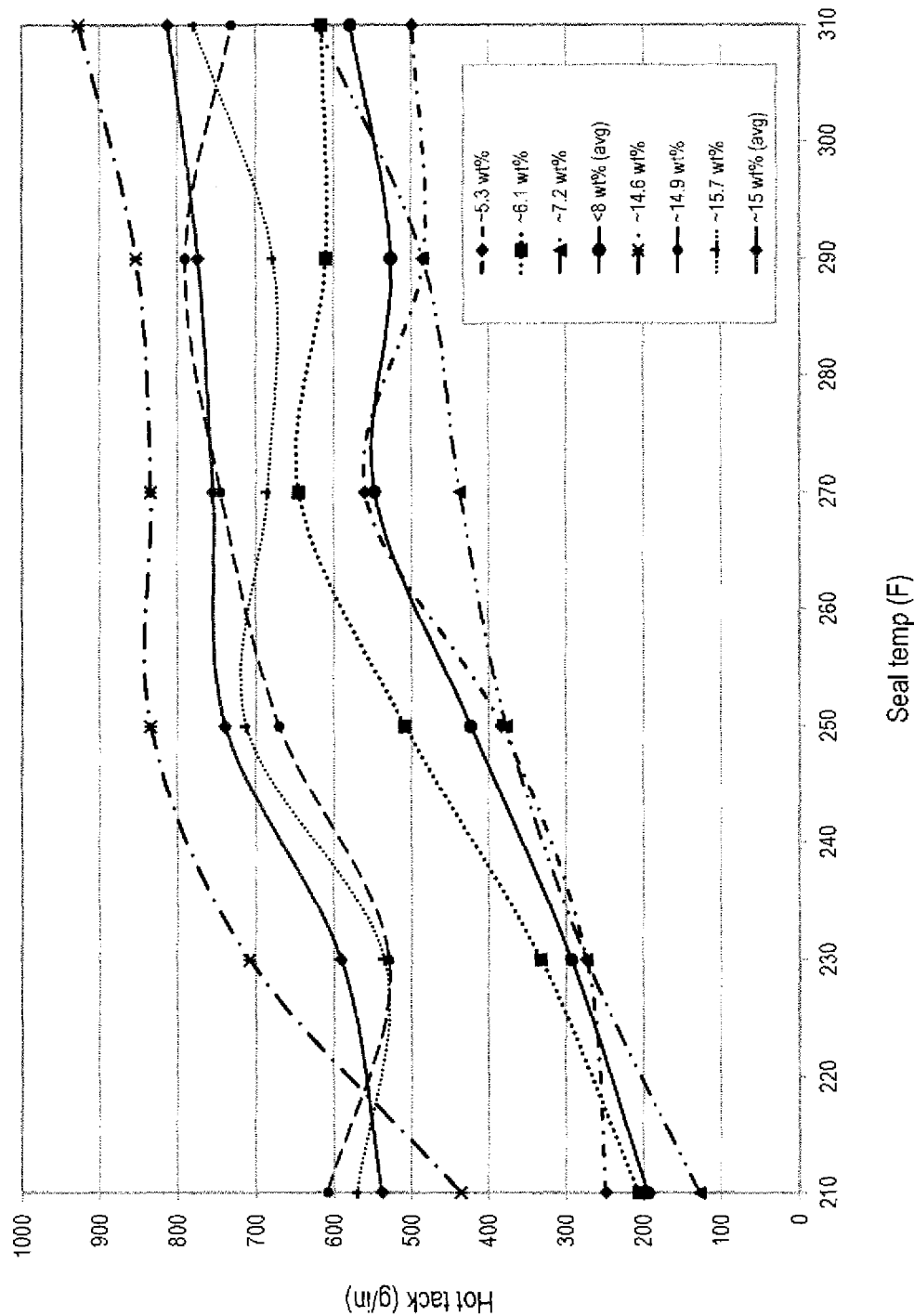
Figure 7:
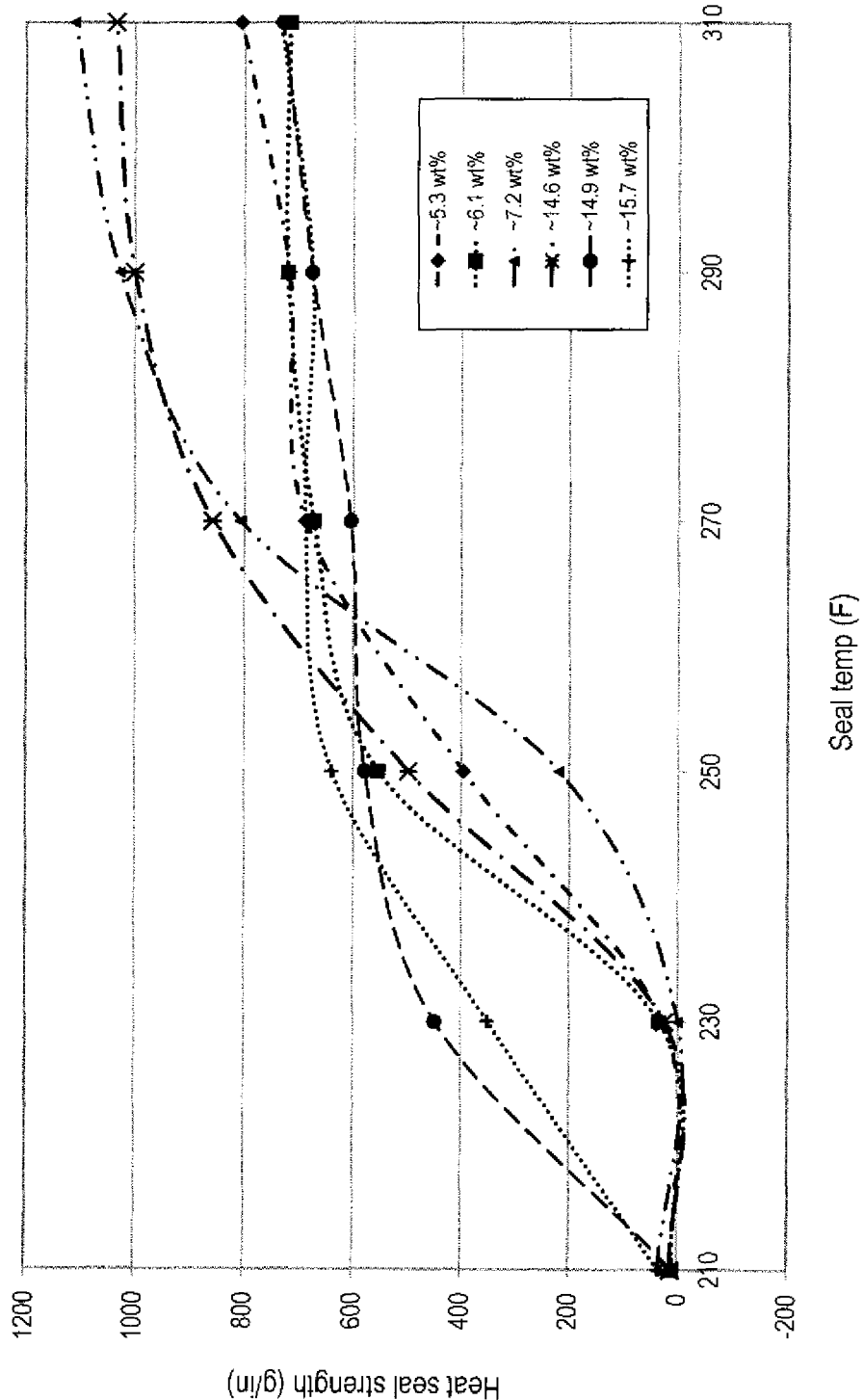

The resulting packaging materials were evaluated for hot tack and heat seal strength as described in Example 1. Moisture was measured on a Moistrex moisture analyzer. The results are presented in Tables 4-5 and FIGS. 6-7, where % Δ is the percent improvement in hot tack as measured using the average hot tack of the control materials (<8 wt % moisture) and the average of the experimental materials (about 15 wt % moisture).

TABLE 4

Hot tack at various moisture levels (g/in)

| Seal Temp (° F.) | Moisture, control matls (wt %) | | | | Moisture, expt matls (wt %) | | | | % Δ |
|---|---|---|---|---|---|---|---|---|---|
| | 5.3 | 6.1 | 7.2 | AVG | 14.6 | 14.9 | 15.7 | AVG | |
| 210 | 248 | 206 | 128 | 194 | 436 | 608 | 570 | 538 | 177 |
| 230 | 273 | 332 | 273 | 293 | 708 | 529 | 535 | 591 | 102 |
| 250 | 383 | 508 | 377 | 423 | 834 | 670 | 712 | 739 | 75 |
| 270 | 560 | 645 | 437 | 547 | 834 | 745 | 685 | 755 | 38 |
| 290 | 484 | 610 | 485 | 526 | 853 | 790 | 678 | 774 | 47 |
| 310 | 499 | 616 | 621 | 579 | 927 | 731 | 779 | 812 | 40 |

TABLE 5

Heat seal strength at various moisture levels (g/in)

| Seal Temp (° F.) | Moisture, control matls (wt %) | | | Moisture, experimental matls (wt %) | | |
|---|---|---|---|---|---|---|
| | 5.3 | 6.1 | 7.2 | 14.6 | 14.9 | 15.7 |
| 210 | 10 | 10 | 36 | 13 | 9.0 | 35 |
| 230 | 28 | 35 | 0 | 25 | 449 | 351 |
| 250 | 396 | 554 | 219 | 498 | 579 | 640 |
| 270 | 688 | 673 | 807 | 858 | 605 | 688 |
| 290 | 718 | 721 | 1027 | 1000 | 676 | 675 |
| 310 | 806 | 717 | 1110 | 1034 | 730 | 735 |

All of the experimental materials exhibited improved hot tack at the elevated moisture levels, with the most significant increases being observed at the lower heat seal temperatures. The increase in hot tack at lower temperatures may be particularly advantageous where lower heat seal temperatures are needed to achieve higher production rates.

Example 5

Various packaging materials were evaluated for hot tack and heat seal strength. To form the base packaging material, a 43 lb/ream TEA-Kraft paper (Spec 2400 from Longview Fibre Paper and Packaging, Inc., Longview Wash.) was coated with about 8 lb/ream DARAN® SL112 PVdC and dried. The resulting material was then coated with about 6 lb/ream DARAN® SL159 PVdC and dried. The total polymer weight was about 14 lb/ream.

The coated paper was then moisturized with water using a Dahlgren moisturizer, perforated, and again moisturized (on the paper side) with a mixture of 98.7 parts water and 1.3 parts Michemlube 156.

Figure 8:
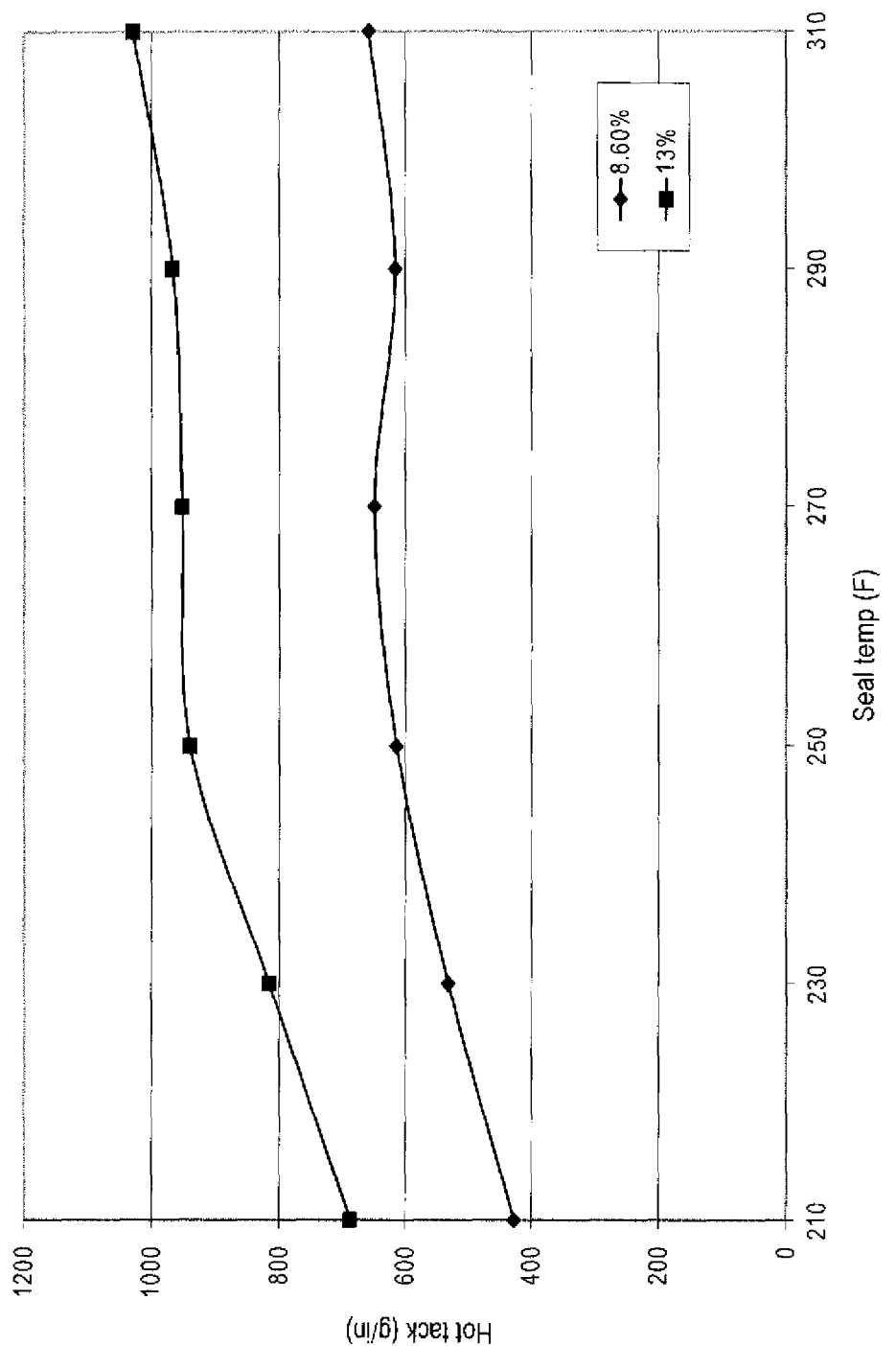

The resulting packaging materials were evaluated for hot tack and heat seal strength as described in Example 1. Moisture was measured on a Moistrex moisture analyzer. The results are presented in Table 6 and FIG. 8.

TABLE 6

| Seal Temp (° F.) | Hot tack (g/in) | | Heat seal strength (g/in) |
|---|---|---|---|
| | 8.6 wt % moisture | 13 wt % moisture | 13 wt % moisture |
| 210 | 427 | 687 | 35 |
| 230 | 532 | 816 | 75 |
| 250 | 614 | 940 | 704 |
| 270 | 649 | 952 | 1024 |
| 290 | 616 | 967 | 1127 |
| 310 | 658 | 1029 | 1123 |

Example 6

Various packaging materials were evaluated for hot tack and heat seal strength. To form the base packaging material, a 43 lb/ream TEA-Kraft paper (Spec 2400 from Longview Fibre Paper and Packaging, Inc., Longview Wash.) was coated with about 4-5 lb/ream DARAN® SL112 PVdC, dried, coated with about 3-4 lb/ream DARAN® SL159 PVdC, and dried. The total polymer weight was about 8 lb/ream.

Figure 9:
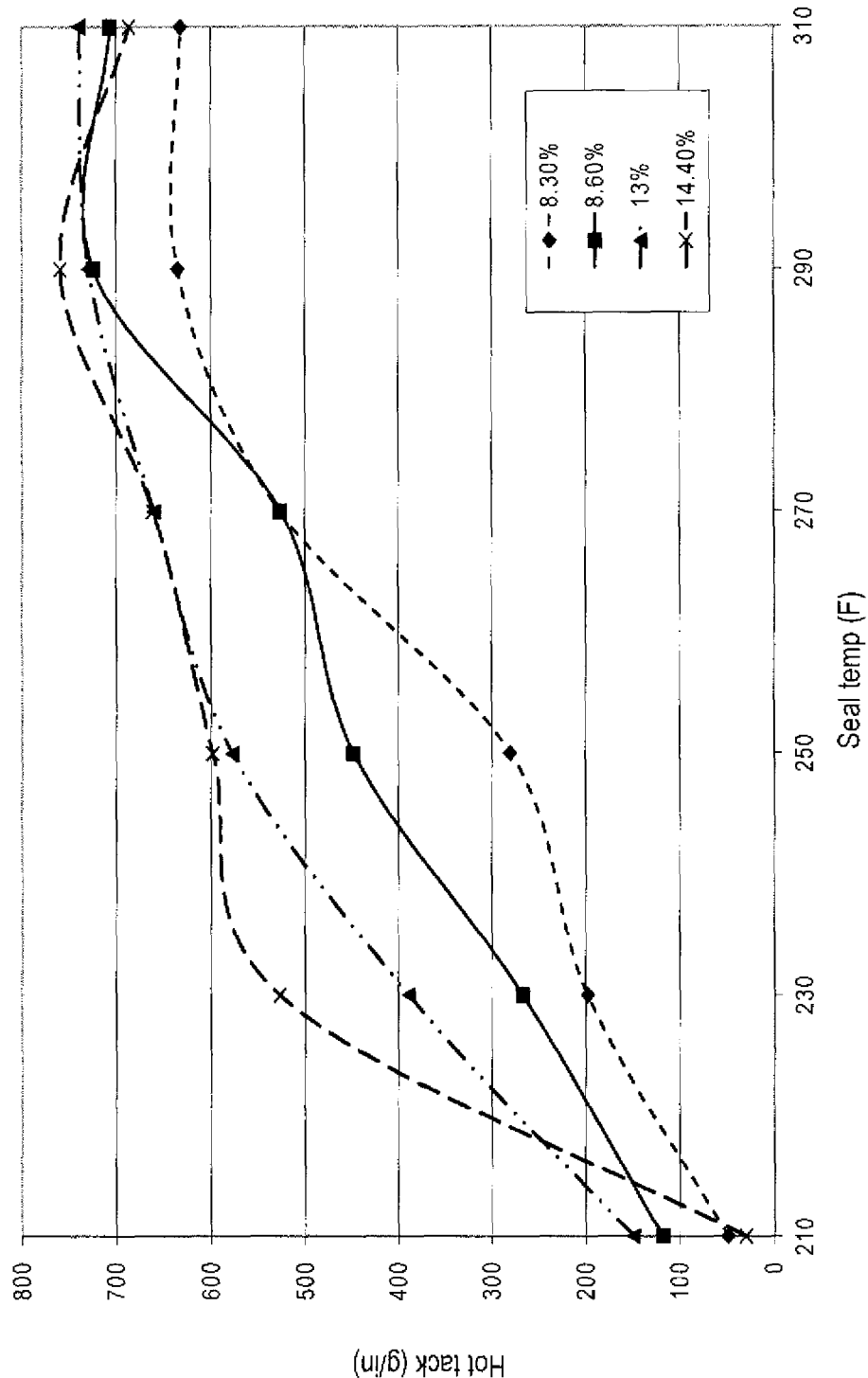

The coated paper was then moisturized using a Dahlgren moisturizer. The moisturized packaging material was then perforated and again moisturized (on the paper side) with a mixture of 98.7 parts water and 1.3 parts Michemlube 156 (Michelman). The resulting packaging materials were evaluated for hot tack and heat seal strength as described in Example 2. Moisture was measured on a Moistrex moisture analyzer. The results are presented in Table 7 and FIG. 9.

TABLE 7

| Seal Temp (° F.) | Hot tack (g/in) at various moisture levels | | | | Heat seal strength (g/in) at various moisture levels | | | |
|---|---|---|---|---|---|---|---|---|
| | 8.3 wt % | 8.6 wt % | 13 wt % | 14.4 wt % | 8.3 wt % | 8.6 wt % | 13 wt % | 14.4 wt % |
| 210 | 49 | 118 | 149 | 30 | 15 | 14 | 0 | 16 |
| 230 | 198 | 267 | 389 | 527 | 80 | 43 | 53 | 84 |
| 250 | 280 | 448 | 577 | 598 | 542 | 549 | 552 | 527 |
| 270 | 527 | 526 | 660 | 661 | 741 | 683 | 729 | 675 |
| 290 | 635 | 724 | 729 | 759 | 830 | 730 | 741 | 733 |
| 310 | 632 | 706 | 739 | 686 | 802 | 727 | 774 | 742 |

Viewing Examples 4-6, it can generally be observed that for a given packaging material, the hot tack increases with moisture content. Thus, the presence of at least about 8 wt % moisture in the packaging material may allow the packaging material to be used under more rigorous conditions. For example, a packaging material according to the present disclosure may be used to form a package with heavier product contents, since the seal is able to withstand the heavier load being dropped into the package. This may provide a significant advantage for many packaging applications.

Further, it can also be generally observed that at a given moisture level (or average moisture level), as the total polymer coat weight is increased, the hot tack increases. Stated differently, a lower polymer coat weight material with a high moisture content can provide at least equivalent (and in some cases, increased) hot tack to a higher polymer coat weight material with a lower moisture content. As a result, it may be possible to achieve the same (or better) level of hot tack using less polymer. This may provide a significant cost advantage over previously available packaging materials.

Although certain embodiments of this invention have been described with a certain degree of particularity, those skilled in the art could make numerous alterations to the disclosed embodiments without departing from the spirit or scope of this invention. All directional references (e.g., over, under, inner, outer, upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, all percentages herein are weight percentages, unless specified otherwise.

It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific aspects, it is to be understood that this detailed description is only illustrative and exemplary of the present invention and is made merely for purposes of providing a full and enabling disclosure of the present invention and to provide the best mode contemplated by the inventor or inventors of carrying out the invention. The detailed description set forth herein is not intended nor is to be construed to limit the present invention or otherwise to exclude any such other embodiments, adaptations, variations, modifications, and equivalent arrangements of the present invention.

What is claimed is:

1. A method of forming a package, the method comprising:
    depositing polyvinylidene chloride on a substrate, wherein the substrate comprises paper;
    drying the polyvinylidene chloride on the substrate to form a packaging material, wherein drying the polyvinylidene chloride on the substrate comprises drying the polyvinylidene chloride on the substrate so that the polyvinylidene chloride and the substrate each comprise less than 5 wt % water;
    applying water to the substrate so that the substrate comprises at least about 8 wt % water; and
    bringing a first portion of the polyvinylidene chloride of the packaging material into contact with a second portion of the polyvinylidene chloride of the packaging material in the presence of heat to form a seal.

2. The method of claim 1, wherein applying water to the substrate so that the substrate comprises at least about 8 wt % water comprises applying water to the substrate so that the substrate comprises from about 10 wt % to about 18 wt % water.

3. The method of claim 1, wherein applying water to the substrate so that the substrate comprises at least about 8 wt % water comprises applying water to the substrate so that the substrate comprises from about 12 wt % to about 16 wt % water.

4. The method of claim 1, wherein applying water to the substrate so that the substrate comprises at least about 8 wt % water comprises applying water to the substrate so that the substrate comprises about 14 wt % water.

5. The method of claim 1, wherein the applying water to the substrate so that the substrate comprises at least about 8 wt % water is for increasing a hot tack of the seal relative to the packaging material including the substrate comprising less than 5 wt % water.

6. The method of claim 5, wherein the hot tack of the seal of the packaging material including the substrate comprising at least about 8 wt % water is at least about 25% greater relative to the packaging material including the substrate comprising less than 5 wt % water.

7. The method of claim 5, wherein the hot tack of the seal of the packaging material including the substrate comprising at least about 8 wt % water is at least about 40% greater relative to the packaging material including the substrate comprising less than 5 wt % water.

8. The method of claim 5, wherein the hot tack of the seal of the packaging material including the substrate comprising at least about 8 wt % water is at least about 75% greater relative to the packaging material including the substrate comprising less than 5 wt % water.

9. The method of claim 5, wherein the hot tack of the seal of the packaging material including the substrate comprising at least about 8 wt % water is at least about 100% greater relative to the packaging material including the substrate comprising less than 5 wt % water.

10. A method of forming a package, the method comprising:
    applying water to a packaging material, wherein the packaging material comprises a layer of polyvinylidene chloride on a paper-based substrate, and applying water to the packaging material comprises applying water to the substrate, wherein the substrate has a moisture content of less than 5 wt % and applying water to the substrate increases the moisture content of the substrate to at least about 8 wt %;
    forming the packaging material into a tubular structure so that a first portion of the layer of polyvinylidene chloride is in contact with a second portion of the layer of polyvinylidene chloride; and
    heating the first portion of the polyvinylidene chloride and the second portion of polyvinylidene chloride to form a seal.

11. The method of claim 10, wherein applying water to the substrate increases the moisture content of the substrate to from about 10 wt % to about 18 wt %.

12. The method of claim 10, wherein applying water to the substrate increases the moisture content of the substrate to from about 12 wt % to about 16 wt %.

13. The method of claim 10, wherein applying water to the substrate increases the moisture content of the substrate to about 14 wt %.

14. The method of claim 10, wherein a hot tack of the seal of the packaging material including the substrate having the moisture content of at least about 8 wt % is at least about 25% greater relative to the packaging material including the substrate having the moisture content of less than 5 wt %.

15. The method of claim 10, wherein a hot tack of the seal of the packaging material including the substrate having the moisture content of at least about 8 wt % is at least about 40% greater relative to the packaging material including the substrate having the moisture content of less than 5 wt %.

16. The method of claim 10, wherein a hot tack of the seal of the packaging material including the substrate having the moisture content of at least about 8 wt % is at least about 75% greater relative to the packaging material including the substrate having the moisture content of less than 5 wt %.

17. The method of claim 10, wherein a hot tack of the seal of the packaging material including the substrate having the moisture content of at least about 8 wt % is at least about 100% greater relative to the packaging material including the substrate having the moisture content of less than 5 wt %.

18. A method of forming a package, the method comprising:
   applying a dispersion comprising polyvinylidene chloride and water to a substrate;
   drying the dispersion on the substrate to form a packaging material, so that the substrate comprises less than 5 wt % water;
   applying water to the substrate within a seal area of the packaging material so that the substrate within the seal area comprises at least about 8 wt % water; and
   heating the seal area of the packaging material to form a seal,
   wherein the at least about 8 wt % water increases a hot tack of the seal relative to the packaging material including the substrate comprising less than 5 wt % water.

\* \* \* \* \*